(12) United States Patent
Muljono et al.

(10) Patent No.: US 9,910,484 B2
(45) Date of Patent: Mar. 6, 2018

(54) VOLTAGE REGULATOR TRAINING

(71) Applicant: INTEL CORPORATION, Santa Clara, CA (US)

(72) Inventors: Harry Muljono, San Ramon, CA (US); Linda K. Sun, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 14/091,125

(22) Filed: Nov. 26, 2013

(65) Prior Publication Data

US 2015/0149796 A1 May 28, 2015

(51) Int. Cl.
  *G06F 1/32* (2006.01)

(52) U.S. Cl.
  CPC ........ *G06F 1/3296* (2013.01); *Y02B 60/1285* (2013.01)

(58) Field of Classification Search
  CPC ..................................................... G06F 1/3296
  See application file for complete search history.

(56) References Cited

U.S. PATENT DOCUMENTS

| | | | | |
|---|---|---|---|---|
| 5,969,554 A * | 10/1999 | Chan | ................ | H03K 19/00361 326/27 |
| 8,331,176 B2 * | 12/2012 | Mozak | ................... | G11C 29/02 365/189.02 |
| 8,531,225 B1 * | 9/2013 | Hussain | ................. | H03K 5/133 327/276 |
| 2004/0123207 A1 * | 6/2004 | Zumkehr | ............. | G11C 7/1051 714/744 |
| 2005/0177771 A1 * | 8/2005 | Miller | ..................... | G06F 11/24 714/25 |
| 2005/0188230 A1 * | 8/2005 | Bilak | ..................... | G06F 1/3203 713/300 |
| 2006/0129852 A1 * | 6/2006 | Bonola | ................. | G06F 1/3203 713/300 |
| 2006/0259840 A1 * | 11/2006 | Abadeer | ............ | G01R 31/3004 714/733 |
| 2009/0243638 A1 * | 10/2009 | Becker | .................... | H04L 25/05 324/762.02 |
| 2009/0244997 A1 * | 10/2009 | Searles | ................ | G11C 7/1051 365/194 |
| 2009/0289681 A1 * | 11/2009 | Keady | ..................... | H04L 25/02 327/179 |
| 2010/0005365 A1 * | 1/2010 | Buchmann | ............ | H03M 13/13 714/758 |
| 2010/0074314 A1 * | 3/2010 | Stojanovic | ........ | H04L 25/03006 375/226 |

(Continued)

*Primary Examiner* — Jaweed A Abbaszadeh
*Assistant Examiner* — Cheri Harrington
(74) *Attorney, Agent, or Firm* — Schwabe, Williamson & Wyatt, P.C.

(57) ABSTRACT

Embodiments including systems, methods, and apparatuses associated with increasing the power efficiency of one or more components of a computing system. Specifically, the system may include a processor chip which may include an on-die voltage regulator (VR) configured to supply a voltage to a component of the processor chip. The processor chip may be coupled with a dynamic random access memory (DRAM). The system may further include an external VR coupled with the DRAM. A BIOS may be configured to regulate the voltage output of one or both of the on-die VR and/or the external VR. Other embodiments may be described or claimed.

17 Claims, 4 Drawing Sheets

(56) References Cited

U.S. PATENT DOCUMENTS

| | | | | |
|---|---|---|---|---|
| 2010/0191991 | A1* | 7/2010 | Berke | G11C 5/143 713/320 |
| 2011/0141827 | A1* | 6/2011 | Mozak | G11C 5/147 365/189.09 |
| 2011/0161748 | A1* | 6/2011 | Casper | G11C 5/02 714/708 |
| 2011/0307671 | A1* | 12/2011 | Fox | G06F 13/4072 711/154 |
| 2012/0087194 | A1* | 4/2012 | Oh | G11C 7/1087 365/189.16 |
| 2012/0102346 | A1* | 4/2012 | Haj-Yihia | G06F 1/3243 713/322 |
| 2012/0243364 | A1* | 9/2012 | Hacking | G11C 5/147 365/227 |
| 2012/0260137 | A1* | 10/2012 | Berke | G06F 13/1673 714/721 |
| 2013/0002410 | A1* | 1/2013 | Fanaswalla | H04B 1/10 340/13.37 |
| 2013/0082671 | A1* | 4/2013 | Ivanov | G05F 1/575 323/274 |
| 2013/0176153 | A1* | 7/2013 | Rachid | H03M 1/12 341/118 |
| 2013/0346721 | A1* | 12/2013 | Giovannini | G11C 7/222 711/167 |
| 2014/0095414 | A1* | 4/2014 | Thurston | G06F 17/5054 706/12 |
| 2014/0145760 | A1* | 5/2014 | Nguyen | H04L 25/0282 326/82 |
| 2014/0281071 | A1* | 9/2014 | Xu | G06F 13/4045 710/105 |
| 2014/0281668 | A1* | 9/2014 | He | G06F 1/3253 714/4.5 |
| 2015/0035378 | A1* | 2/2015 | Calhoun | A61B 5/04004 307/104 |
| 2015/0092065 | A1* | 4/2015 | Radhakrishnan | H04N 21/43632 348/180 |

* cited by examiner

VOLTAGE REGULATOR TRAINING

FIELD

Embodiments of the present invention relate generally to the technical field of power regulation. Specific embodiments relate to increasing power efficiency through voltage regulation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

State-of-the-art client and server processors may rely on on-die voltage regulators (VRs). On-die VRs may be elements of the processor that serve or regulate a voltage supplied to another element of the processor. In some processors, the on-die VRs may be referred to as fully integrated VRs (FIVRs). On-die VRs may be used to supply power to elements of the processor such as a memory controller, digital or analog input/output (I/O) ports or circuits, analog front end (AFE) ports or circuits, or other elements of the processor. In some cases, the on-die VRs may supply power to critical components such as delay-locked loop (DLL) and phase interpolator (PI) components which may directly impact the I/O system margin. In some cases, the I/O or AFE ports or circuits may be ports or circuits allowing communication with a double data rate (DDR) dynamic random access memory (DRAM) such as third generation (DDR3), fourth generation (DDR4), or some other type of DDR DRAM. In some cases, the I/O or AFE ports or circuits may be considered DDR ports or circuits. Similarly, in some cases the DRAM may be powered by an output voltage supplied by an external VR.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods, and storage media associated with increasing the power efficiency of a computing system are described herein. Specifically, a processor chip may include a plurality of components such as a memory controller, I/O circuits, or an AFE circuit. The processor chip may further include one or more on-die VRs that are configured to provide a voltage to the one or more components. The processor chip may be coupled with a DRAM via a DDR communication link. The DRAM and/or one or more components of the processor chip may be coupled with an external VR that is configured to provide a voltage to the DRAM and/or the one or more components of the processor chip.

In some cases, the output of the on-die VR or the external VR may be calibrated prior to use in a computing system by comparing the voltage output of the on-die VR to a reference voltage using a voltage tester. The voltage output of the on-die VR may be calibrated against the reference voltage before the processor is sold, shipped, or used in a computing system. Commonly, the reference voltage may be a reference voltage that enables the processor to achieve the highest possible speed of communication between the processor and the DRAM. Additionally or alternatively, the reference voltage may be based on compliance with time/voltage margin specifications of the I/O ports or circuits. Typically, these time/voltage margin specifications may be based on a worst case system (i.e., highest time/voltage margin) configuration, which may not be necessary or desirable in certain other implementations. Therefore, the time/voltage margin specifications may be artificially high and when the on-die VRs or external VRs are used in a computing system, the system may not achieve desired power efficiency.

In embodiments, a chip including a basic input/output system (BIOS) may be coupled with one or more of the external VR and/or the on-die VRs and configured to improve power efficiency of the system. Specifically, the BIOS may be configured to perform a training loop during a start-up or reset event of the system. In embodiments, the BIOS training loop may be a training algorithm that performs performance and power optimization steps by adjusting electrical parameters of different components of a system. For example, the BIOS may change the electrical parameters such as the transmission power of signals transmitted between the AFE circuit and the DRAM. Additionally, the BIOS may change the voltage output parameters of one or more of the external VR and/or on-die VRs which may subsequently alter the power and performance characteristics of the DRAM, I/O circuits, AFE circuit, or some other component of the system. Specifically, during the training loop, the BIOS may cause the chip to send a signal as an output of the training loop to one or both of the external VR and/or an on-die VR to alter the voltage output of the external VR and/or one or more of the on-die VRs. By altering the voltage output of the VR(s) during execution of the training loop, the voltage output of the VR(s) may be set according to the specific power needs of the processor component or the DRAM. Therefore, the power usage of the component and/or the DRAM may be reduced, and so the overall power usage of the system may be made more efficient.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smartphone (which may include one or more processors), a tablet, laptop computer, a set-top box, a gaming console, and so forth.

Figure 1:
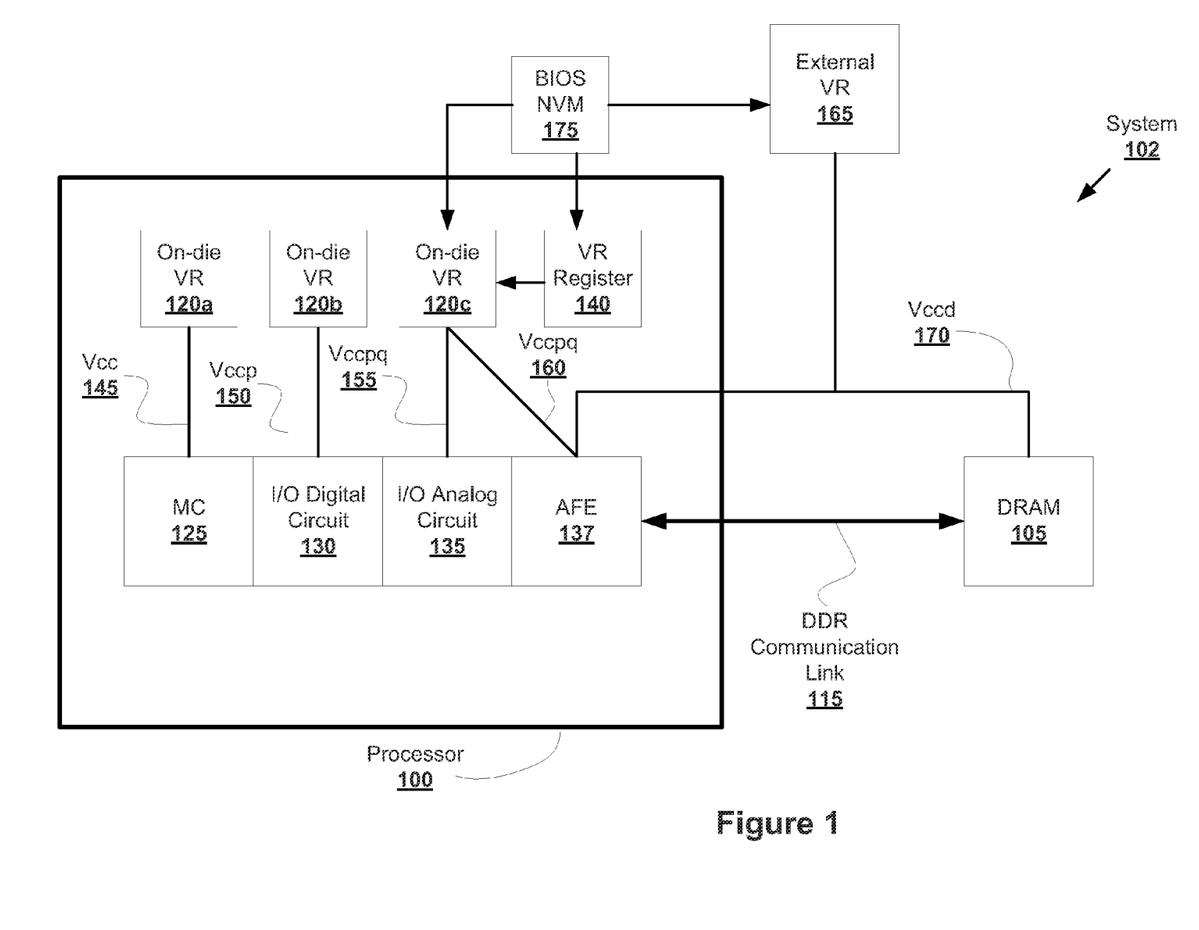
FIG. 1 illustrates an example basic input/output system (BIOS) connection to various voltage regulators, in accordance with various embodiments.

FIG. 1 depicts an example of a system 102 that may include a processor 100 coupled with a DRAM 105. As noted above, the DRAM 105 may be a DDR DRAM such as a DDR3, DDR4, or some other type of DRAM as defined by the joint electron device engineering council (JEDEC) standards. For example the DRAM 105 may be a DDR3 DRAM as defined by the JEDEC JESD79-3F standard published in July of 2012, or the DRAM 105 may be a DDR4 DRAM as defined by the JEDEC JESD79-4 standard, published in September of 2012. The processor 100 may be coupled with the DRAM 105 by way of a DDR communication link 115 configured to transfer data between the processor 100 and the DRAM 105.

The processor 100 may include one or more on-die voltage regulators (VRs) such as on-die VRs 120a, 120b, and 120c. In addition, the processor may include one or more components such as a memory controller (MC) 125, an I/O digital circuit 130, an I/O analog circuit 135, and an AFE 137. Although in some embodiments one or both of the I/O digital circuit 130 and I/O analog circuit 135 may be hardware modules, stand-alone processors, or some other combination of hardware, software, and/or firmware, they will be jointly referred to herein as circuits for the sake of description. Additionally, the AFE 137 may be a circuit, a hardware module, or some other combination of hardware, software, and/or firmware elements. As described herein, this element or elements will simply be referred to as an AFE 137. In some embodiments, one or more of the on-die VRs may be coupled with a VR register. Specifically, as shown in FIG. 1, in some embodiments the processor 100 may include a VR register 140 coupled with on-die VR 120c. In some embodiments, on-die VRs 120a and 120b may also be coupled with respective VR registers (not shown for the sake of clarity), while in other embodiments multiple on-die VRs such as on-die VRs 120a and 120b may be coupled with the same VR register. Generally, the VR registers such as VR register 140 may be configured to store a value in a memory, and supply that value to an on-die VR such as on-die VR 120c. The on-die VR 120c may then supply a voltage based at least in part on the supplied value from the VR register 140, as will be explained in further detail below. In some embodiments, one or more of the components may be separate from, but communicatively coupled with the processor 100. For example, in some embodiments the memory controller 125 may be separate from, but communicatively coupled with, the processor 100. In some embodiments, certain of the components may not be present on the processor 100, or additional components such as additional on-die VRs or VR registers may be coupled with the processor.

In some embodiments, a single on-die VR may be configured to supply a voltage to a single component of the processor 100. As an example, on-die VR 120a may be configured to supply a voltage 145 to the memory controller 125. The supplied voltage 145 from the on-die VR 120a may be referred to as a "Vcc" voltage, and may be a digital supply voltage. Additionally, on-die VR 120b may be configured to supply a voltage 150 to the I/O digital circuit 130. The supplied voltage 150 from the on-die VR 120b may be referred to as a "Vccp" voltage, and may be a digital supply voltage that is dedicated for the use of a peripheral, in this case the I/O digital circuit 130. Additionally, on-die VR 120c may be configured to supply a voltage 155 and 160 to the I/O analog circuit 135 and the AFE 137, respectively. In embodiments, the voltages 155 and 160 may be referred to as "Vccpq" voltages. The Vccpq voltages 155 or 160 may be similar to the Vccp voltage 150 described above, but the on-die VR 120c may be configured to produce significantly less electrical noise in the Vccpq voltages 155 and 160 than, for example the Vccp voltage 150. Therefore, the Vccpq voltages 155 or 160 may refer to a quiet control voltage that is supplied to a specific peripheral, in this case the I/O analog circuit 135 and the AFE 137. As used herein, a quiet control voltage may be a control voltage having an amount of electrical noise that is below a predetermined threshold noise voltage. The predetermined threshold noise voltage may be set based on control voltage characteristics desired by circuits to which the control voltage is provided. For example, because the I/O analog circuit 135 and the AFE 137 are analog, they may be more susceptible to electrical noise, and therefore the relatively low noise quiet voltage may be desirable. It will be understood that the specific voltages are described herein only as examples, and in other embodiments an on-die VR such as on-die VR 120a may be provide a voltage such as the Vcc voltage 145 to both the memory controller 125 and the I/O digital circuit 130. Other combinations of the on-die VRs, the voltages, and the components of the processor 100 may be possible in other implementations of the processor 100.

In some cases, the system 102 may further include an external VR 165 coupled with one or both of the processor 100 and the DRAM 105. The external VR 165 may be configured to supply a voltage 170 to the DRAM 105 and one or more components of the processor 100 such as the AFE 137. In embodiments, the voltage 170 may be referred to as a "Vccd" voltage, and may be a digital supply voltage supplied to the DRAM. In embodiments, the Vccd voltage 170 may be a relatively higher voltage than, for example, the Vcc voltage 145, Vccp voltage 150, or Vccpq voltages 155 and 160. In embodiments, the AFE 137 may be coupled with both the Vccpq voltage 160 and the Vccd voltage 170 because a portion of the AFE 137 may operate with the Vccpq 160 voltage as a relatively low predriver voltage. By contrast, the final driver/receiver stage of the AFE 137 may interface with the DDR communication link 115 and require a relatively higher voltage such as the Vccd 170.

In some embodiments, the system may further include a chip including a BIOS. Specifically, the BIOS may be firmware or software stored on a non-volatile memory (NVM) such as a read only memory (ROM), an electrically erasable programmable ROM (EEPROM), or some other type of chip. In some embodiments the NVM may be a flash memory. As described herein, the NVM storing the BIOS shall be referred to as a BIOS NVM 175. In embodiments, the BIOS NVM may be communicatively coupled with the processor 100 and the external VR 165. The BIOS NVM 175 may store instructions to initialize and test various system hardware components. For example, during power-on of a system or reset of the system, the instructions in the BIOS NVM 175 may be executed and a training loop may begin. As described above, the training loop may be a training algorithm designed to optimize power or performance of one or more components of system 102 such as the AFE 137, DRAM 105, or some other component. During the training loop various settings of certain components may be adjusted to correspond to one or more pre-defined parameters. As an example, although not shown in FIG. 1 for the sake of clarity, the BIOS NVM 175 may also be directly coupled with one or both of the AFE 137 and the DRAM 105. During the execution of the training loop, the BIOS NVM 175 may adjust the electrical parameters of one or both of the AFE 137 and the DRAM 105. By adjusting these electrical parameters, one or more control parameters of the AFE 137 and the DRAM 105 may be adjusted so that the AFE 137 and/or DRAM 105 operate with a specific power requirement, at a specific speed, at a specific data transfer rate, or according to some other electrical parameter.

In embodiments of the present disclosure, and as noted above, the BIOS NVM 175 may be coupled with the external VR 165 and the processor 100. Specifically, the BIOS NVM 175 may be coupled with a VR register 140 of the processor 100, or alternatively the BIOS NVM 175 may be coupled directly with the on-die VR 120c. In addition to or instead of adjusting the electrical parameters of the AFE 137 and/or the DRAM 105, the BIOS NVM 175 may further adjust the voltage output level of one or both of the on-die VR 120c and/or the external VR 165 during execution of the training loop of the BIOS NVM 175 at a power-up or system reset event by sending a signal as an output of the training loop to one or both of the on-die VR 120c and/or the external VR 165. Specifically, the BIOS NVM 175 may send a signal to the on-die VR 120c to directly adjust the on-die VR 120c, or the BIOS NVM 175 may send a signal to the VR register 140 to adjust the value stored in the VR register 140. As noted above, by adjusting the value stored in the VR register 140, the voltage output value of the on-die VR 120c may be adjusted.

In embodiments, by adjusting the voltage output levels of the on-die VR 120c and/or the external VR 165, the BIOS NVM 175 may increase the overall power efficiency of the system 102. Specifically, as noted above the output voltage such as Vccpq voltage 155, Vccpq voltage 160, or Vccd voltage 170 of one or more of the on-die VRs such as the on-die VR 120c, or the external VR 165, may be calibrated during the chip manufacturing process to provide an adequate system margin for a worst-case power margin scenario. However when the on-die VR 120c and/or the external VR 165 are used in the system 102, the worst-case power margin scenario may be artificially high, and so in certain implementations of the system the output voltage of one or more of the VRs may be decreased while still meeting the desired operating margins of the system 102.

As an example, in some embodiments the Vccd voltage 170 may consume up to 970 mW per channel based on the initial configuration of the external VR 165 during the chip manufacturing process. Specifically, a channel may be a group of conductive paths, for example the DDR communication link 115, where data bits may be transmitted in parallel between two communicating agents, for example the processor 100 and the DRAM 105. As described herein, a channel may encompass not only 64 bits of data plus the related control, address, and/or command bits, but also the specific transmitter and receiver blocks used by the processor 100 and DRAM 105 to transmit or receive the information. For example, the 970 mW of power may be consumed by the processor 100, DRAM 105, and DDR communication link 115 to transmit the data based on the Vccd voltage 170 supplied by the external VR 165. Additionally, in some embodiments the Vccpq voltage 155 or 160 may consume up to 431 mW per channel based on the initial calibration of the on-die VR 120c during the chip manufacturing process. However, the system 102 may experience a power reduction of approximately 200 mW per channel if the voltage output of the on-die VR 120c is reduced from 0.95 V to 0.8 V on the Vccpq voltage 155 and 160. This power reduction could be feasible if the power margins of the I/O analog circuit 135 and the AFE 137 allow for such a reduction while still operating as required by the system 102. An even larger power reduction on the Vccd voltage 170 could be seen depending on the operating margins of the DRAM 105.

Therefore, the potential power reduction of the system 102 could be significant if the BIOS NVM 175 reduces the voltage output of one or both of the on-die VR 120c and the external VR 165. Specifically, the power savings of the system 102 may be significant if, instead of using predetermined voltages output by the on-die VR 120c and/or the external VR 165 that are configured before implementation of the on-die VR 120c and/or the external VR 165 into the system 102, the voltage outputs of the on-die VR 120c and/or the external VR 165 are set during the training loop of the BIOS NVM 175 dependent on the specific margin requirements of the I/O analog circuit 135, the AFE 137, and/or the DRAM 105. In some embodiments, one or more of the on-die VRs 120a, 120b, and 120c may be considered a variable VR. In some embodiments, the VR register 140 or the BIOS NVM 175 may include one or more extra pins with which to carry voltage control information to the on-die VR 120c. Specifically, the VR register 140 or the BIOS NVM 175 may couple with other components of the system 102 using one or more pins that are configured to transmit or receive electrical signals. In order to carry the voltage control information to the on-die VR 120c, one or both of the VR register 140 or the BIOS NVM 175 may be coupled to the VR register 140 using an additional pin which can transmit or receive the additional voltage control information.

Figure 2:
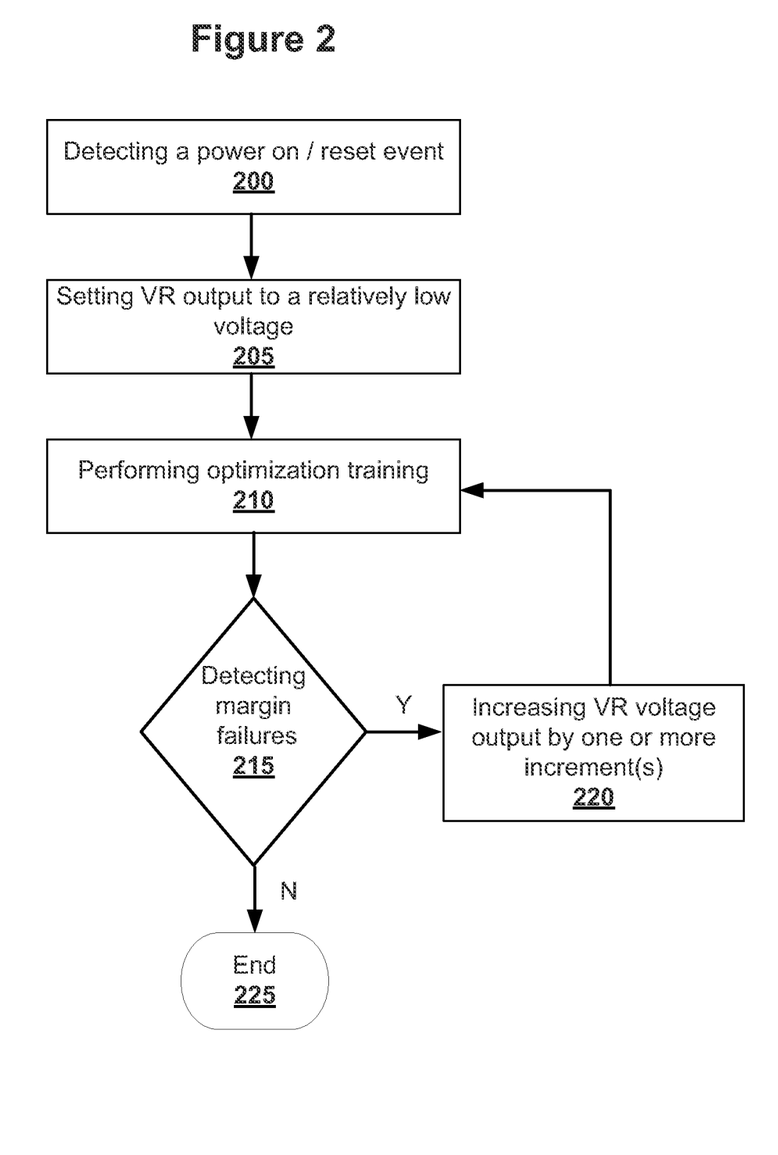
FIG. 2 illustrates an example method of calibrating one or more voltage regulators, in accordance with various embodiments.
Figure 3:
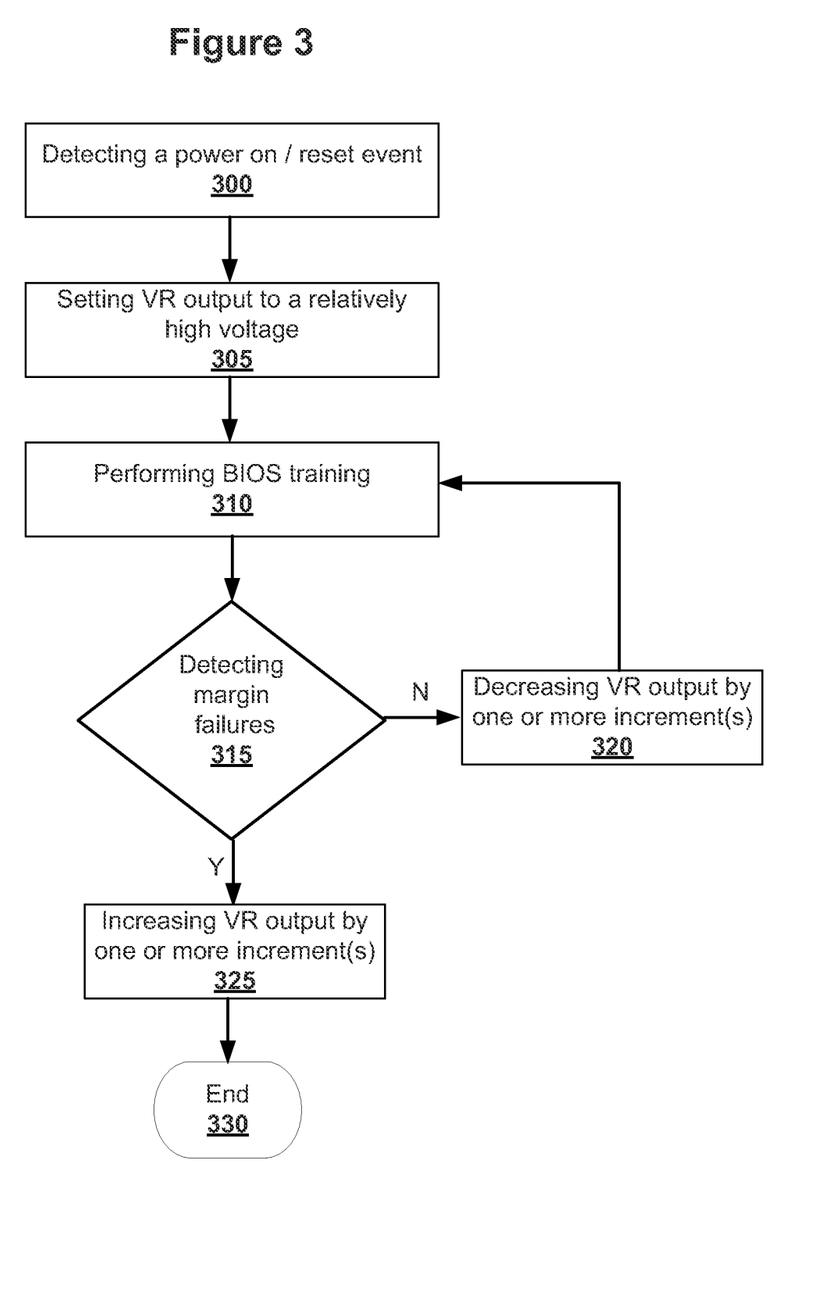
FIG. 3 illustrates an alternative method of calibrating one or more voltage regulators, in accordance with various embodiments.

FIG. 2 depicts an example process by which a BIOS such as that implemented on BIOS NVM 175 may adjust a VR voltage output. In FIGS. 2 and 3, the generic term VR is used herein and may refer to the on-die VR 120c and/or the external VR 165. In some cases the voltage output of the on-die VR 120c and/or the external VR 165 may be adjusted sequentially or in parallel. In other cases the voltage output of only one of the on-die VR 120c and/or the external VR 165 may be adjusted.

Initially, a power-on or a reset event of a system such as system 102 may be detected at the BIOS NVM at 200. The power-on event may be the result of a user turning the system on, a power supply to the system being activated, or some other reason. The system reset event may be the result of a hardware or software failure, a reboot command, a temporary power interruption, or some other reason.

The BIOS NVM may set the voltage output of the VR to a relatively low voltage at 205. Depending on the specific system implementation, and as will be described below, the relatively low voltage may be the lowest voltage that the VR is capable of outputting, or the relatively low voltage may be a voltage higher than the lowest voltage that the VR is capable of outputting. Next, the optimization training may begin at 210. Specifically, the optimization training may detect at 215 whether there is a margin failure of the component receiving the supplied voltage from the VR. For example, the BIOS NVM 175 may identify a margin failure based on a failed transmission of a bit signal across the DDR communication link 155. Specifically, the BIOS NVM 175 may identify a margin failure based on a mismatch between a transmitted signal and a previously transmitted error correcting code (ECC). Specifically, the transmitter of the transmitted signal may be configured to calculate an ECC based on the signal to be transmitted. The transmitter may then transmit the signal along with the calculated ECC. The system component that receives the signal may calculate an ECC based on the received signal and compare it with the ECC sent by the transmitter. If the received ECC and the transmitted ECC do not match one another, then a margin failure may be identified and the BIOS NVM 175 may be notified.

If a margin failure is detected at 215, then the voltage output of the VR may be increased by one or more increments at 220 and the process may loop back to the performing of the optimization training at 210. In embodiments, the increment may be a set value such as a single millivolt. In other embodiments, for example where the voltage output of the on-die VR 120c is based on a value stored in a VR register 140, the increment may be based on an increase of the value stored by the VR register 140. In some embodiments, the increment may result in an increase of between 5 and 10 millivolts in the voltage output of the VR, though in other embodiments the increase may be more or less than the 5 to 10 millivolts. As noted above, in embodiments the increase at 220 may only be a single increment so that the voltage output is only slightly above where a margin failure may occur, while in other embodiments it may be identified that the voltage output could be increased significantly before there are no margin failures, and so the VR voltage output could be increased by a plurality of increments at 220.

The optimization training at 210, margin failure detection at 215, and VR voltage output increase at 220 may repeat until no margin failures are detected at 215, at which point the training sequence may end at 225.

FIG. 3 depicts an alternative example process by which a BIOS such as that implemented on BIOS NVM 175 may adjust a VR voltage output. Initially, a power-on or a reset event of a system such as system 102 may be detected at the BIOS NVM at 300. As noted with respect to element 200 of FIG. 2, the power-on event may be the result of a user turning the system on, a power supply to the system being activated, or some other reason. The system reset event may be the result of a hardware or software failure, a reboot command, a temporary power interruption, or some other reason.

The BIOS NVM may then set the voltage output of the VR to a relatively high voltage at 305. Depending on the specific system implementation, and as will be described below, the relatively high voltage may be the highest voltage that the VR is capable of outputting, or the relatively high voltage may be a voltage lower than the highest voltage that the VR is capable of outputting. Next, the optimization training may begin at 310. Specifically, the optimization training may detect at 315 whether there is a margin failure of the component receiving the supplied voltage from the VR. For example, the BIOS NVM may detect the margin failure as described above.

If a margin failure is not detected at 315, then the voltage output of the VR may be decreased by one or more increments at 320 and the process may loop back to performing the BIOS training at 310. As described above with respect to FIG. 2, the increment may be a set value such as a single millivolt. In other embodiments, for example where the voltage output of the on-die VR 120c is based on a value stored in a VR register 140, the increment may be based on a decrease of the value stored by the VR register 140. In some embodiments, the increment may result in a decrease of between 5 and 10 millivolts in the voltage output of the VR, though in other embodiments the decrease may be more or less than the 5 to 10 millivolts. In embodiments the decrease at 320 may only be a single increment, though in other embodiments it may be known that the voltage output of the VR could be decreased significantly, so the decrease may be a decrease of multiple increments at 320.

The optimization training at 310, margin failure detection at 315, and VR voltage output decrease at 320 may repeat until a margin failure is detected at 315. At that point, the VR voltage output may be increased by one or more increments at 325. Specifically, because the VR voltage output is decreasing to the point of margin failure, the system may increase the VR voltage output at 325 to the last known value before a margin failure occurred. In other embodiments it may be desirable for the output voltage of the VR to be set at a point higher above the voltage where a margin failure may occur, for example so that there is more capacity for unpredicted power drain, so the VR output may be increased by a plurality of increments at 325. The process may then end at 330.

In embodiments, the processes of FIGS. 2 and 3 may be selected based on specific system implementations, latency requirements of the BIOS training loop, or for some other reasons. In some embodiments the relatively high voltage set at 305 or the relatively low voltage set at 205 may be the highest or lowest possible voltages of the VR. However, the BIOS training loop may take time during system start-up or during a reset event. Therefore, in order to reduce or minimize the delay observed by the user during execution of the BIOS training loop, which may be referred to as latency, it may be useful to reduce the length of the BIOS training loop.

As an example, in some embodiments there may be indications that the voltage output of the VR may have acceptable power margins at a relatively low output voltage, but the process of FIG. 3 may be desirable based on other system implementation considerations. Therefore, the relatively high voltage set at 305 may be set at a point of the voltage output range of the VR between the highest or lowest point, so that the time it takes to get from the starting voltage and the final output voltage of the VR, and therefore the latency of the training loop, is reduced. Similarly, the relatively low voltage set at 205 may be set at a point between the highest or lowest point of the voltage output range of the VR in order to reduce the latency of the training loop.

Although in FIG. 1 the on-die VR 120c is coupled with the BIOS NVM 175 and the processes of FIGS. 2 and 3 are described with respect to on-die VR 120c or external VR 165, in other embodiments the BIOS NVM 175 may be additionally or alternatively coupled with one or more of the other on-die VRs such as on-die VR 120a, 120b, or some other on-die VR.

Figure 4:
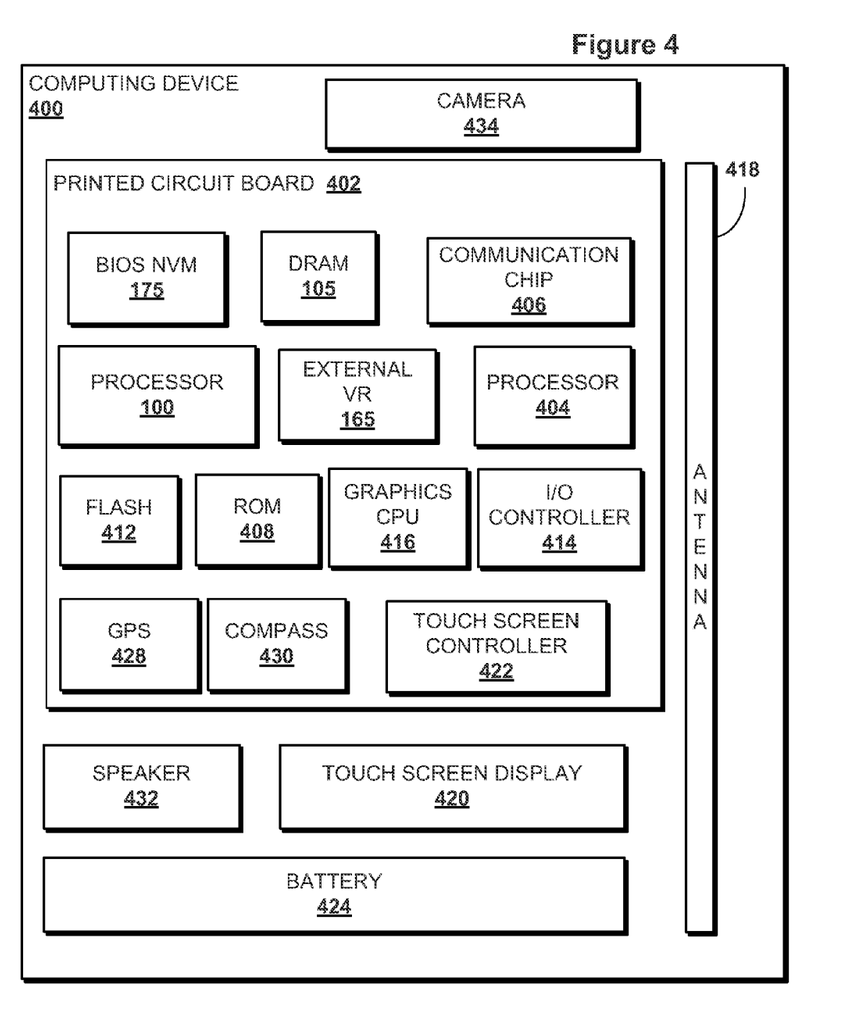
FIG. 4 illustrates an example system configured to perform the methods described herein, in accordance with various embodiments.

FIG. 4 illustrates an example computing device 400 in which systems such as the earlier described processor 100, DRAM 105, external VR 165, and/or BIOS NVM 175 may be incorporated, in accordance with various embodiments. Computing device 400 may include a number of components, one or more additional processor(s) 404, and at least one communication chip 406.

In various embodiments, the one or more processor(s) 100 or 404 each may include one or more processor cores. In various embodiments, the at least one communication chip 406 may be physically and electrically coupled to the one or more processor(s) 100 or 404. In further implementations, the communication chip 406 may be part of the one or more processor(s) 100 or 404. In various embodiments, computing device 400 may include printed circuit board (PCB) 402. For these embodiments, the one or more processor(s) 100 or 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, volatile memory (e.g., the DRAM 105), non-volatile memory such as ROM 408, an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD))(not shown), and so forth. In various embodiments, the processor 100 may be integrated on the same die with other components to form a System on Chip (SoC) as shown in FIG. 1. In embodiments, one or both of the DRAM 105 and/or the ROM 408 may be or may include a cross-point non-volatile memory.

In various embodiments, computing device 400 may include resident persistent or non-volatile memory, e.g., flash memory 412. In some embodiments, the one or more processor(s) 100 or 404 and/or flash memory 412 may include associated firmware (not shown) storing programming instructions configured to enable computing device 400, in response to execution of the programming instructions by one or more processor(s) 100 or 404, external VR 165, or the BIOS NVM 175 to practice all or selected aspects of the blocks described above with respect to FIG. 2 or 3. In various embodiments, these aspects may additionally or alternatively be implemented using hardware separate from the one or more processor(s) 100 or 404, external VR 165, BIOS NVM 175, or flash memory 412.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 802.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 400 may be any other electronic device that processes data.

In embodiments, a first example of the present disclosure may include an apparatus comprising: an analog front end (AFE); and a voltage regulator coupled with the AFE, the voltage regulator configured to supply a voltage to the AFE; wherein the voltage regulator is configured to dynamically alter the voltage to reduce power consumption of the AFE based at least in part on a result of a training loop performed on system power up or system reset.

Example 2 may include the apparatus of claim 1, wherein the voltage is a first voltage, the voltage regulator is an on-die voltage regulator, and the apparatus is coupled with an external voltage regulator configured to supply a second voltage to the AFE, and wherein the external voltage regulator is configured to dynamically alter the second voltage to reduce power consumption of the AFE based at least in part on the result of the training loop performed on system power up or system reset.

Example 3 may include the apparatus of example 2, wherein the external voltage regulator is further coupled with a double data rate fourth generation (DDR4) dynamic random access memory (DRAM), the external voltage regulator configured to supply the second voltage to the DRAM.

Example 4 may include the apparatus of example 2, wherein the first voltage is a low noise voltage.

Example 5 may include the apparatus of any of examples 1-4, wherein the on-die voltage regulator is further to supply the voltage to an input/output (I/O) analog circuit coupled with the AFE.

Example 6 may include the apparatus of any of examples 1-4, wherein the training loop is performed by a basic input/output system (BIOS).

Example 7 may include the apparatus of any of examples 1-4, wherein the voltage regulator is configured to dynamically alter the voltage based at least in part upon a margin failure detected during the training loop.

Example 8 may include the apparatus of any of examples 1-4, wherein the apparatus is coupled with a memory controller.

Example 9 may include a method comprising: setting, by a basic input/output system (BIOS), a voltage output of an on-die voltage regulator to a first voltage; identifying, by the BIOS, an occurrence of a margin failure at an analog front end (AFE) configured to receive the first voltage; and adjusting, by the BIOS in response to the occurrence of the margin failure, the voltage output of the on-die voltage regulator by an increment.

Example 10 may include the method of example 9, wherein the margin failure is a first margin failure and the increment is a first increment, and further comprising setting, by the BIOS, a voltage output of an external voltage regulator to a second voltage; identifying, by the BIOS, an occurrence of a second margin failure at a dynamic random access memory (DRAM) configured to receive the second voltage; and adjusting, by the BIOS and based at least in part on the occurrence of the second margin failure, the voltage output of the external voltage regulator by a second increment.

Example 11 may include the method of example 10, wherein the first increment or the second increment are a negative value.

Example 12 may include the method of example 10, wherein the first increment or the second increment are a positive value.

Example 13 may include the method of example 10, wherein the DRAM is a double data rate fourth generation (DDR4) DRAM.

Example 14 may include the method of any of examples 9-13, wherein the AFE is coupled with an input/output analog circuit that is configured to receive the first voltage from the on-die voltage regulator.

Example 15 may include the method of any of examples 9-13, wherein the setting the voltage output is based at least in part on a power-on event or a reset event.

Example 16 may include a system comprising: a memory controller coupled with a dynamic random access memory (DRAM); an on-die voltage regulator to supply a first voltage to an analog front end (AFE) coupled with the DRAM; an external voltage regulator configured to supply a second voltage to the DRAM; wherein the on-die voltage regulator and the external voltage regulator are configured to alter the first voltage or the second voltage based at least in part on a signal from a basic input/output system (BIOS).

Example 17 may include the system of example 16, wherein the on-die voltage regulator is further to supply the first voltage to an input/output analog circuit coupled with the AFE.

Example 18 may include the system of examples 16 or 17, wherein the DRAM is a double data rate fourth generation (DDR4) DRAM.

Example 19 may include the system of examples 16 or 17, wherein the signal is an output of a training loop of the BIOS.

Example 20 may include the system of examples 16 or 17, wherein the first voltage is a low noise voltage.

Example 21 may include an apparatus comprising: means to set a voltage output of an on-die voltage regulator to a first voltage; means to identify an occurrence of a margin failure at an analog front end (AFE) configured to receive the first voltage; and means to adjust, in response to the occurrence of the margin failure, the voltage output of the on-die voltage regulator by an increment.

Example 22 may include the apparatus of example 21, wherein the margin failure is a first margin failure and the increment is a first increment, and further comprising: means to set a voltage output of an external voltage regulator to a second voltage; means to identify an occurrence of a second margin failure at a dynamic random access memory (DRAM) configured to receive the second voltage; and means to adjust, based at least in part on the occurrence of the second margin failure, the voltage output of the external voltage regulator by a second increment.

Example 23 may include the apparatus of example 22, wherein the first increment or the second increment are a negative value.

Example 24 may include the apparatus of example 22, wherein the first increment or the second increment are a positive value.

Example 25 may include the apparatus of example 22, wherein the DRAM is a double data rate fourth generation (DDR4) DRAM.

Example 26 may include the apparatus of any of example 21-25, wherein the AFE is coupled with an input/output analog circuit that is configured to receive the first voltage from the on-die voltage regulator.

Example 27 may include the apparatus of any of examples 21-25, wherein the set the voltage output is based at least in part on a power-on event or a reset event.

Example 28 may include one or more non-tangible computer readable media comprising instructions configured to cause a basic input/output system (BIOS), upon execution of the instructions by a processor coupled with the BIOS, to: set a voltage output of an on-die voltage regulator to a first voltage; identify an occurrence of a margin failure at an analog front end (AFE) configured to receive the first voltage; and adjust, in response to the occurrence of the margin failure, the voltage output of the on-die voltage regulator by an increment.

Example 29 may include the one or more computer readable media of example 28, wherein the margin failure is a first margin failure and the increment is a first increment, and further comprising instructions to: set a voltage output of an external voltage regulator to a second voltage; identify an occurrence of a second margin failure at a dynamic random access memory (DRAM) configured to receive the second voltage; and adjust, based at least in part on the occurrence of the second margin failure, the voltage output of the external voltage regulator by a second increment.

Example 30 may include the one or more computer readable media of example 29, wherein the first increment or the second increment are a negative value.

Example 31 may include the one or more computer readable media of example 29, wherein the first increment or the second increment are a positive value.

Example 32 may include the one or more computer readable media of example 29, wherein the DRAM is a double data rate fourth generation (DDR4) DRAM.

Example 33 may include the one or more computer readable media of any of examples 28-32, wherein the AFE is coupled with an input/output analog circuit that is configured to receive the first voltage from the on-die voltage regulator.

Example 34 may include the one or more computer readable media of any of examples 28-32, wherein the set the voltage output is based at least in part on a power-on event or a reset event.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
   an analog front end (AFE) on a processor die;
   an on-die voltage regulator coupled with the AFE, the on-die voltage regulator to supply a first voltage to the AFE, wherein the on-die voltage regulator is on the processor die; and
   an external voltage regulator external to the processor die coupled with the AFE to supply a second voltage to the AFE,
   wherein the on-die voltage regulator is to dynamically alter the first voltage to reduce power consumption of the AFE based at least in part on a result of a training loop performed on system power up or system reset, wherein the training loop is to include detection of whether there is a first margin failure of the AFE based at least in part on an adjustment of the first voltage and the training loop is also to include detection of a second margin failure based at least in part on an adjustment of the second voltage, and wherein the external voltage regulator is to dynamically alter the second voltage to reduce power consumption of the AFE based at least in part on the training loop performed on system power up or system reset.

2. The apparatus of claim 1, wherein the external voltage regulator is further coupled with a double data rate fourth generation (DDR4) dynamic random access memory (DRAM), the external voltage regulator to supply the second voltage to the DRAM.

3. The apparatus of claim 1, wherein the first voltage is a low noise voltage.

4. The apparatus of claim 1, wherein the on-die voltage regulator is further to supply the first voltage to an input/output (I/O) analog circuit coupled with the AFE, wherein the I/O analog circuit is on the processor die.

5. The apparatus of claim 1, wherein the training loop is performed by a basic input/output system (BIOS).

6. The apparatus of claim 1, wherein the apparatus includes a memory controller on the processor die.

7. A method comprising:
   setting, by a basic input/output system (BIOS), a voltage output of an on-die voltage regulator to a first voltage;
   identifying, by the BIOS, an occurrence of a margin failure at an analog front end (AFE) that is to receive the first voltage; and
   adjusting, by the BIOS in response to the occurrence of the margin failure, the voltage output of the on-die voltage regulator by an increment, wherein the on-die voltage regulator is on a processor die and the AFE is on the processor die,
   wherein the margin failure is a first margin failure and the increment is a first increment, and further comprising setting, by the BIOS, a voltage output of an external voltage regulator external to the processor die to a second voltage;
   identifying, by the BIOS, an occurrence of a second margin failure at a dynamic random access memory (DRAM) that is to receive the second voltage; and
   adjusting, by the BIOS and based at least in part on the occurrence of the second margin failure, the voltage output of the external voltage regulator by a second increment.

8. The method of claim 7, wherein the first increment or the second increment are a negative value.

9. The method of claim 7, wherein the first increment or the second increment are a positive value.

10. The method of claim 7, wherein the DRAM is a double data rate fourth generation (DDR4) DRAM.

11. The method of claim 7, wherein the AFE is coupled with an input/output analog circuit that is configured to receive the first voltage from the on-die voltage regulator, wherein the input/output analog circuit is on the processor die.

12. The method of claim 7, wherein the setting the voltage output of the on-die voltage regulator is based at least in part on a power-on event or a reset event.

13. A system comprising:
   a memory controller coupled with a dynamic random access memory (DRAM);
   an on-die voltage regulator to supply a first voltage to an analog front end (AFE) coupled with the DRAM; and
   an external voltage regulator to supply a second voltage to the DRAM,
   wherein the on-die voltage regulator and the AFE are on a processor die, the external voltage regulator is external to the processor die, and wherein the on-die voltage regulator is to alter the first voltage based at least in part on a first signal from a basic input/output system (BIOS) and the external voltage regulator is to alter the second voltage based at least in part on a second signal from the BIOS.

14. The system of claim 13, wherein the on-die voltage regulator is further to supply the first voltage to an input/output analog circuit coupled with the AFE, wherein the input/output analog circuit is on the processor die.

15. The system of claim 13, wherein the DRAM is a double data rate fourth generation (DDR4) DRAM.

16. The system of claim 13, wherein the first signal is a first output of a training loop of the BIOS and the second signal is a second output of the training loop of the BIOS.

17. The system of claim 13, wherein the first voltage is a low noise voltage.

* * * * *